United States Patent [19]

Yasunaga

[11] Patent Number: 4,845,753

[45] Date of Patent: Jul. 4, 1989

[54] PITCH DETECTING DEVICE

[75] Inventor: Satoshi Yasunaga, Tokyo, Japan

[73] Assignee: NEC Corporation, Tokyo, Japan

[21] Appl. No.: 943,217

[22] Filed: Dec. 18, 1986

[30] Foreign Application Priority Data

Dec. 18, 1985 [JP] Japan ................................ 60-283066

[51] Int. Cl.4 ................................................ G01L 7/02

[52] U.S. Cl. ........................................ 381/38; 381/37; 381/49; 364/513.5

[58] Field of Search ........................ 381/36, 39, 40, 41, 381/42, 43, 49, 46, 50, 29, 30, 31; 364/513.5

[56] References Cited

U.S. PATENT DOCUMENTS

| | | | |
|---|---|---|---|
| 4,282,406 | 8/1981 | Yato et al. | 381/49 |
| 4,561,102 | 12/1985 | Prezas | 381/49 |
| 4,701,954 | 10/1987 | Atal | 381/49 |

*Primary Examiner*—William M. Shoop, Jr.
*Assistant Examiner*—Brian K. Young
*Attorney, Agent, or Firm*—Sughrue, Mion, Zinn, Macpeak & Seas

[57] ABSTRACT

A pitch detecting device includes an inverse filter for receiving a voice signal and subjecting the voice signal to inverse filter processing, thereby obtaining a residual signal of the voice, a correlation calculating circuit for obtaining an autocorrelation function of an output of the inverse filter, a detector for detecting a maximum value of the output from the correlation calculating circuit and outputting it as a pitch of the voice signal, and a circuit for receiving the voice signal, extracting spectrum data of the voice signal, and controlling the order of the inverse filter in accordance with the spectrum data.

5 Claims, 5 Drawing Sheets

PITCH DETECTING DEVICE'

BACKGROUND OF THE INVENTION

The present invention relates to a pitch detecting device for detecting a fundamental pitch frequency of voice and, more particularly, to a pitch detecting device of a voice analyzer/synthesizer in which voice spectrum data, fundamental pitch frequency data, and so on are used as transmission parameters.

In voice transmission using a digital transmission system, a method such as a linear prediction coding method is used to perform compression of data amount or secret conversation. According to this method, only basic parameters which constitute a voice, such as voice signal spectrum data, voiced/unvoiced data, a fundamental pitch frequency, voice amplitude data, and so on, are extracted at every predetermined periods, digitized and transmitted, and reproduced by a receiver. For example, assume that a voice signal is band-compressed to a digital signal of 2,400 bps. In this case, when a frame period as a basic parameter extraction unit is set to be 20 ms, 48 bits are assigned to each frame.

The spectrum data is called a prediction coefficient in the linear prediction coding method, a PARCOR coefficient in the partial autocorrelation method, and an LSP coefficient in the line spectrum pair analysis method, and represents phonemic data of a voice. The voiced/unvoiced data is data used for selecting a sound source in accordance with whether the analysis frame is a voiced or unvoiced frame when speech synthesis is performed. The fundamental pitch frequency is the fundamental frequency of a voice in a voiced frame. When speech synthesis is performed, the fundamental pitch frequency becomes a pulse interval of a voiced sound source. The amplitude data is data representing electric power of an input voice and is usually expressed by the product of the amplitude mean of an input voice and the prediction residual amplitude upon spectrum data extraction.

A pitch detecting device used in a conventional voice analyzer/synthesizer detects the pitch from a maximum value of the autocorrelation function or a minimum value of the amplitude mean difference function from an input voice waveform or a residual waveform obtained by filtering an input voice through an inverse filter. Particularly, when a method using a residual waveform is used, the spectrum envelope of an input voice is removed and the impulse of a vocal cord appears conspicuously as shown in FIG. 1B. Therefore, a better performance is obtained than a method for detecting the pitch directly from an input voice waveform. FIG. 1A shows an original waveform. In FIGS. 1A and 1B, time is plotted in units of 4 ms on the axis of abscissa.

However, when the input voice waveform is, e.g., a sine wave which, when input in an inverse filter, is filtered with a very high gain, the residual waveform becomes white noise, as shown in FIG. 2B, and no conspicuous impulse appears. It becomes then difficult to detect the pitch even by autocorrelation or the like. FIG. 2A shows an original waveform. In FIGS. 2A and 2B, the time is plotted in units of 4 ms on the axis of abscissa.

SUMMARY OF THE INVENTION

It is an object of the present invention to provide a pitch detecting device in which the conventional drawbacks are removed and which has a control means for controlling the order of an inverse filter in accordance with a mean prediction residual obtained by spectrum data.

The pitch detecting device according to the present invention comprises: an inverse filter for receiving a voice signal and subjecting the voice signal to inverse filter processing, thereby obtaining a residual signal of the voice; correlation calculating means for calculating an autocorrelation function of an output of the inverse filter; means for detecting a maximum value of the output from the correlation calculating means and outputting an index value corresponding to the maximum value as a pitch of the voice signal; and means for receiving the voice signal, extracting spectrum data of the voice signal, and controlling an order of the inverse filter in accordance with the spectrum data.

DETAILED DESCRIPTION OF PREFERRED EMBODIMENT

Figure 1A:
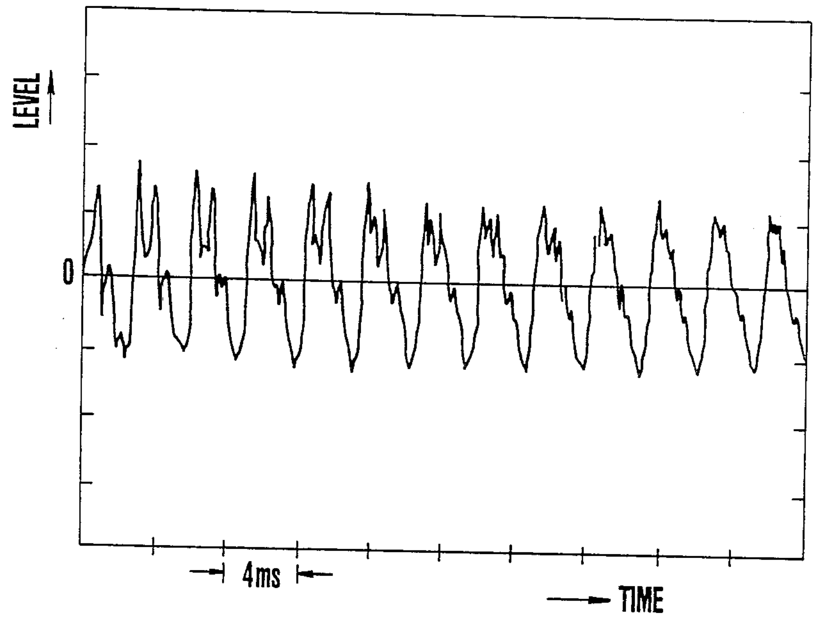
FIG.1A (PRIOR ART)
FIGS. 1A and 1B are views for explaining the waveforms of input and output signals of a conventional pitch detecting device.
Figure 1B:
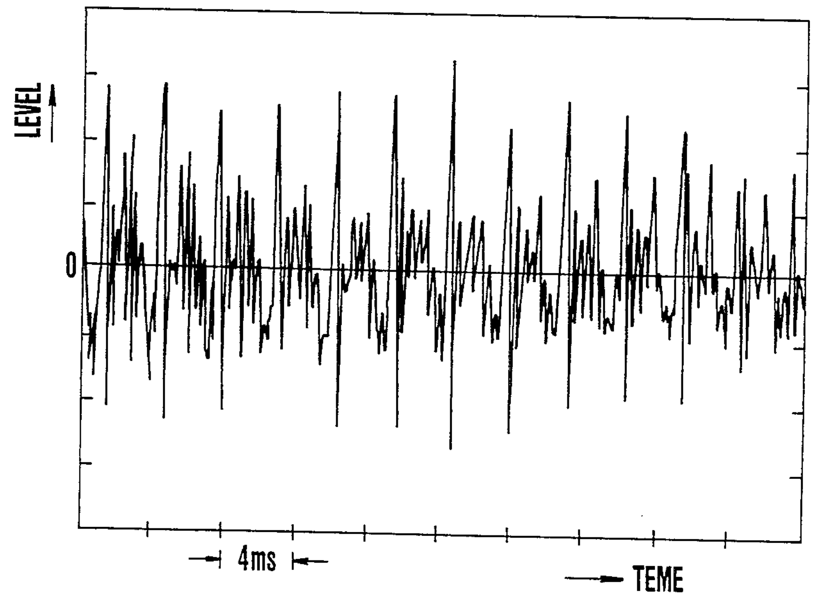
FIG.1B (PRIOR ART)
Figure 2A:
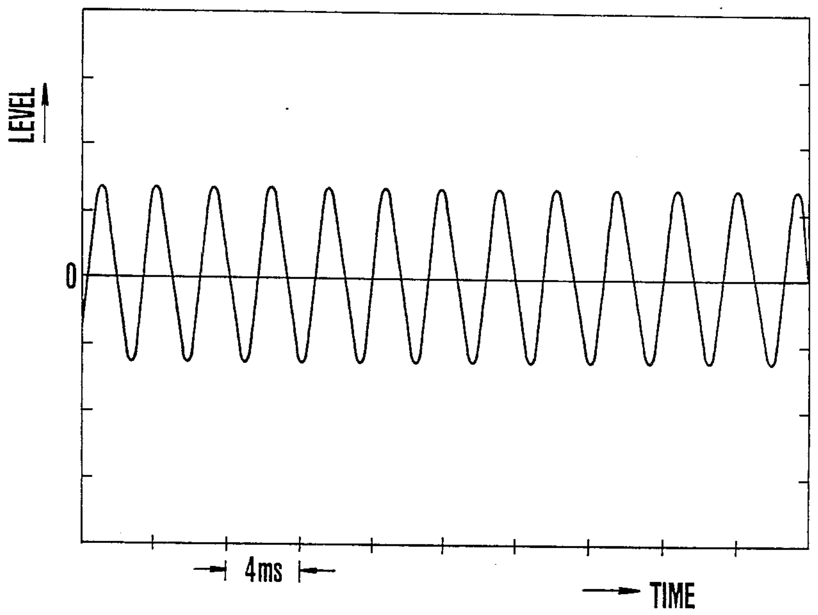
FIG.2A (PRIOR ART)
FIGS. 2A and 2B are views for explaining the waveforms of input and output signals of the conventional pitch detecting device.
Figure 2B:
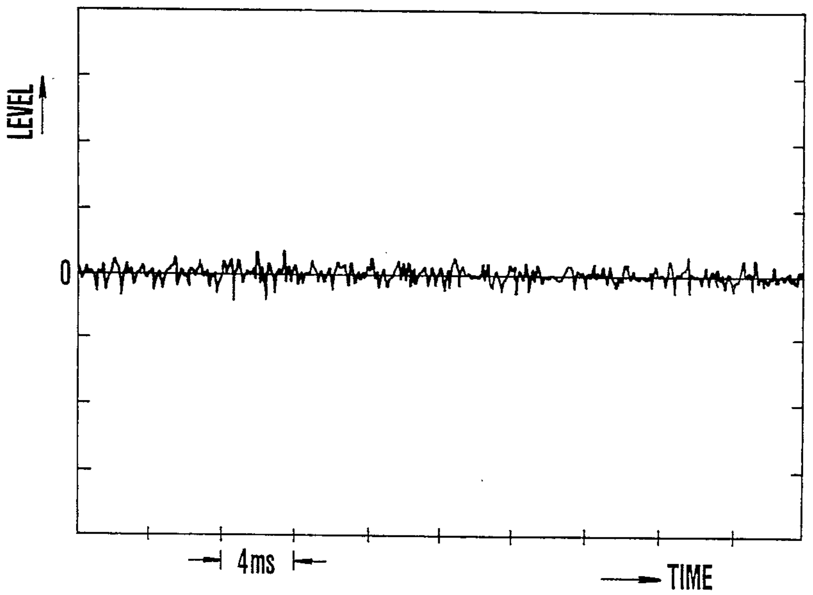
FIG.2B (PRIOR ART)
Figure 3A:
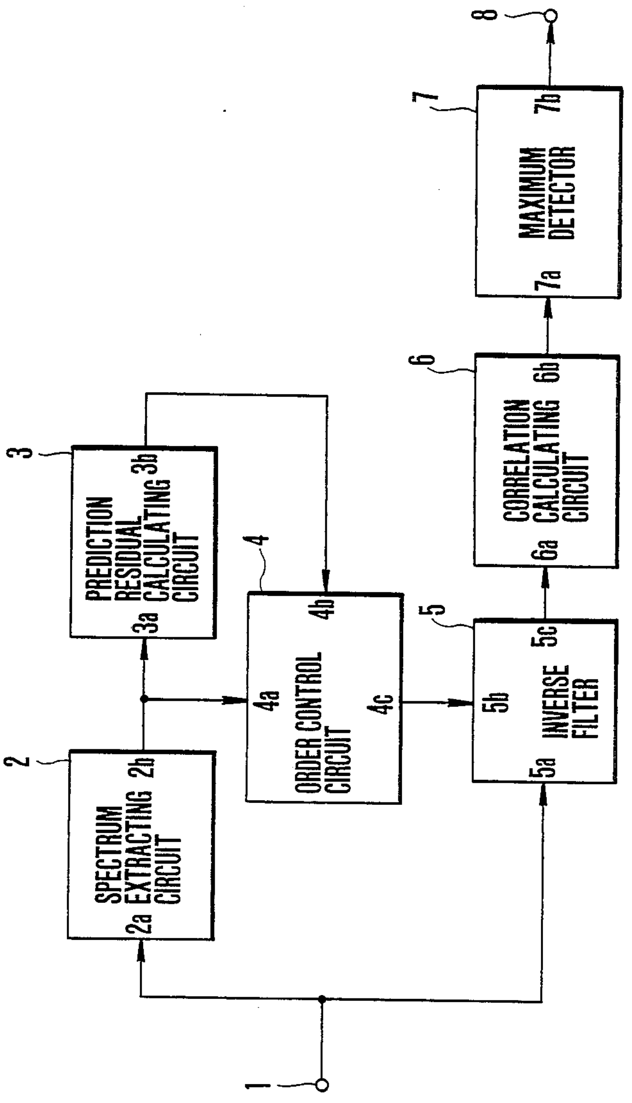
FIG. 3A is a block diagram showing an embodiment of a pitch detecting device of the present invention.

Referring to FIG. 3A, a voice input terminal 1 for receiving a voice signal is connected to an input terminal 2*a* of a spectrum extracting circuit 2 for extracting the spectrum of the input signal and to an input terminal 5*a* of an inverse filter 5. The inverse filter 5 calculates a residual signal of the voice input signal supplied from the input terminal 5*a* by an inverse filter function using spectrum data supplied from an input terminal 5*b* as a coefficient. An output terminal 2*b* of the spectrum extracting circuit 2 is connected to an input terminal 3*a* of a prediction residual calculating circuit 3 and to an input terminal 4*a* of an order control circuit 4. An output terminal 3*b* of the prediction residual calculating circuit 3 is connected to a control terminal 4*b* of the order control circuit 4, and an output terminal 4*c* thereof is connected to the control terminal 5*b* of the inverse filter 5. The order control circuit 4 controls the order of the inverse filter 5 in accordance with a mean prediction residual obtained from spectrum data. An output terminal 5*c* of the inverse filter 5 is connected to an input terminal 6*a* of a correlation calculating circuit 6, and an output terminal 6*b* thereof is connected to an input terminal 7*a* of a maximum detector 7. The maximum detector 7 detects the fundamental pitch of an input voice from the correlation function of the residual signal and outputs it to a pitch output terminal 8.

The operation of the pitch detecting device having the above arrangement in FIG. 3A will be described. A voice supplied from the voice input terminal 1 is input to the spectrum extracting circuit 2 such as a PARCOR analyzer. The prediction residual calculating circuit 3 calculates the mean prediction residual of a parameter group from a spectrum parameter and supplies it to the order control circuit 4 as a control input signal. The order control circuit 4 produces an order signal representing an order to be set in the inverse filter 5 and outputs the signal to the inverse filter 5. The inverse filter 5 calculates a residual signal by using the order signal. The residual signal is used to calculate the autocorrelation function by the correlation calculating circuit 6, and to determine the pitch by the maximum detector 7. The obtained fundamental pitch frequency is output from the pitch output terminal 8.

Figure 3B:
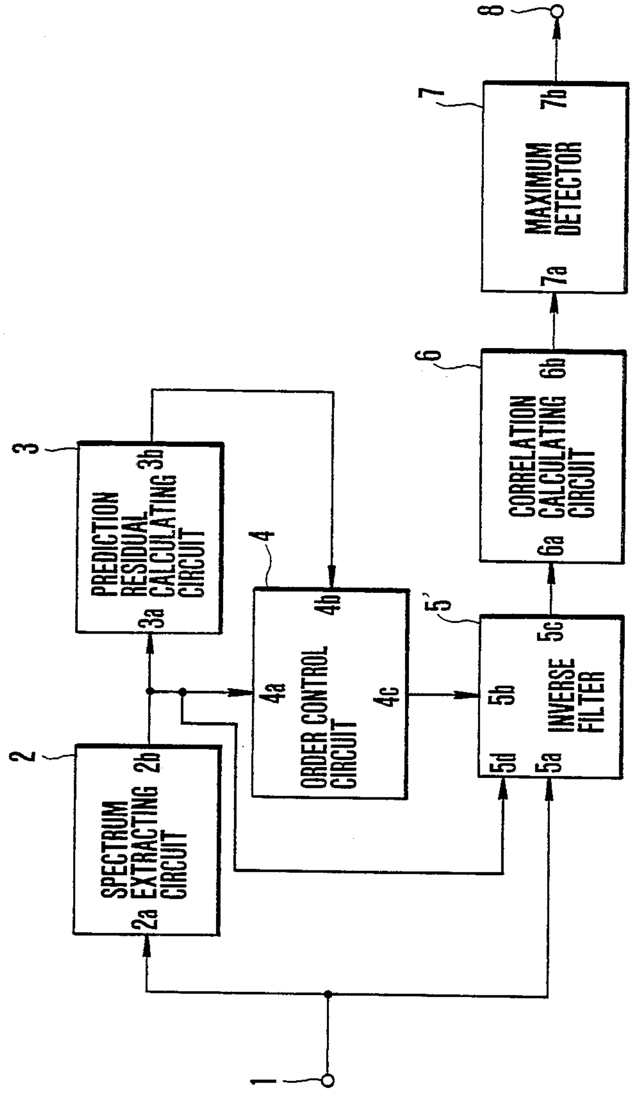
FIG. 3B is a block diagram showing another embodiment of a pitch detecting device of the present invention.

FIG. 3B is a block diagram of another embodiment of the present invention. The same reference numerals in FIG. 3B denote the same functional blocks as in FIG. 3A. The difference between the circuit arrangements of FIGS. 3A and 3B is that an output terminal of the spectrum extracting circuit 2 is connected to an input terminal 5*d* of the inverse filter 5′ in FIG. 3B.

The operation of the pitch detecting device shown in FIG. 3B will be described. The spectrum parameter output from the spectrum extracting circuit 2 is supplied to the prediction residual calculating circuit 3, order control circuit 4, and inverse filter 5′. The mean prediction residual calculated in the prediction residual calculating circuit 2 is supplied to the order control circuit 4 as a control input signal. The order control circuit 4 supplies an order control signal to the inverse filter 5′ such that, when the calculated mean prediction residual is smaller than a predetermined value, the gain of the inverse filter 5′ becomes large, resulting in that the order of the spectrum parameter is controlled to be small. The inverse filter 5′ calculates the residual signal by using the order-controlled spectrum parameter. The correlation calculating circuit 6 and the maximum detector 7 operate as described above.

Figure 4:
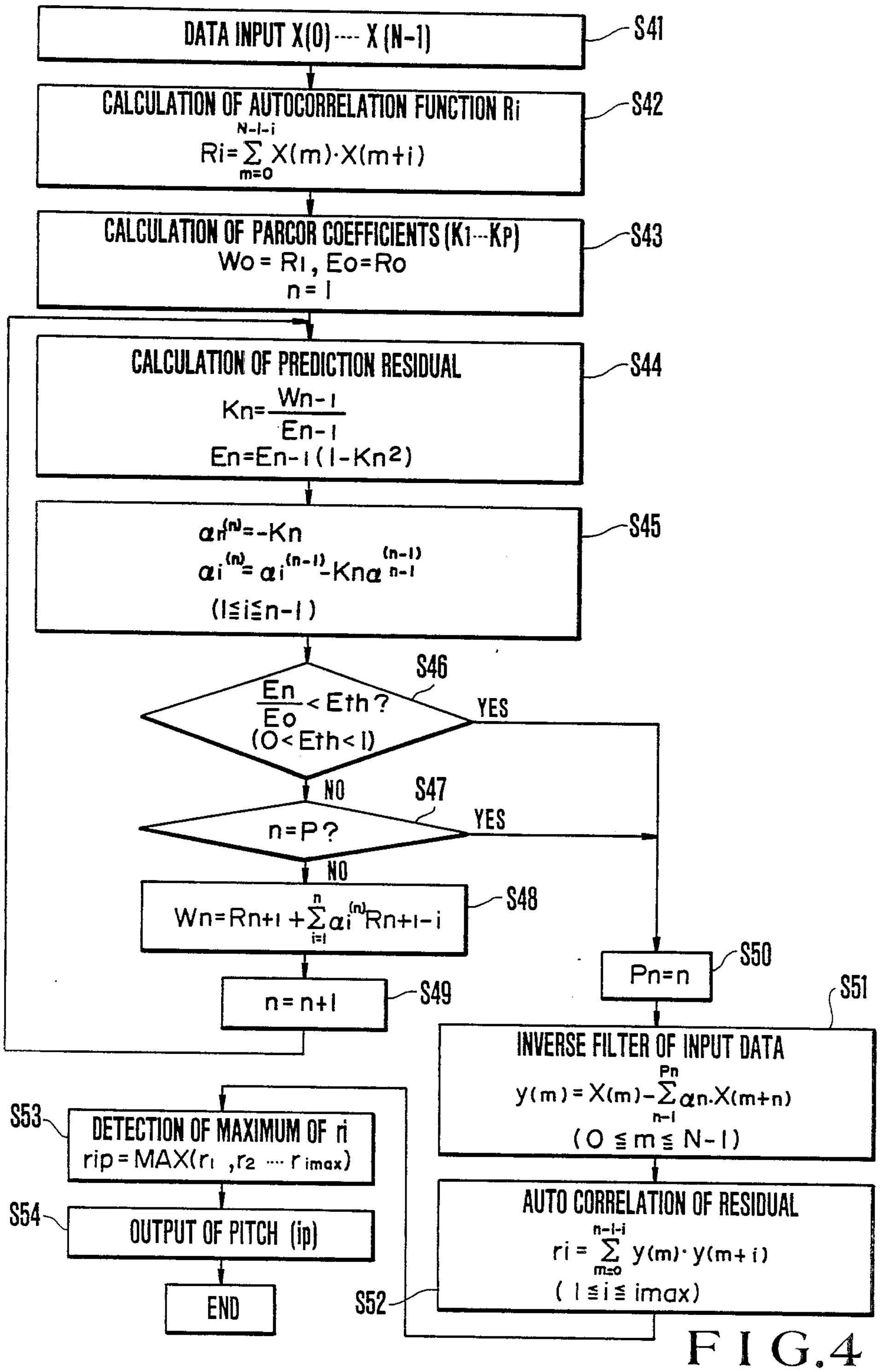
FIG. 4 is a flow chart for explaining an operation of another embodiment of the present invention.

FIG. 4 is a flow chart of an embodiment wherein the circuit shown in FIG. 3 is realized with a microprocessor.

Referring to FIG. 4, a voice data inputs $x(0), \ldots, x(N-1)$ are input to the microprocessor (Step S41). A PARCOR coefficient is calculated using the input data $x(0), \ldots, x(N-1)$ in accordance with the Durbin sequential calculation method. More specifically, an autocorrelation function (R0, . . . , Rp) is calculated in step S42. A series of calculations in steps S43 to S48 are repeated while sequentially incrementing n, thereby calculating a prediction residual En in every cycle. In step S46, the ratio of the prediction residuals En and E0, that is, a ratio En/E0 of residual En to function E0 is compared with a threshold value Eth which is predetermined to be a value between 0 and 1, e.g., 0.1. When En/E0 is smaller than Eth, the flow goes out the loop and advances to the calculation in step S50. When En/E0 is not smaller than Eth and when $n=p$ is established in S47, the flow goes out the loop and advances to S50. In step S50, the maximum order Pn is updated to the value of n after step S46 or S47. With the series of operations in steps S42 to S50, the operations of the spectrum extracting circuit 2, the prediction residual calculating circuit 3, and the order control circuit 4 shown in FIGS. 3A and 3B are performed by single processing. Subsequently, in step S51, an inverse filter calculation for the input data $x(0), \ldots, x(N-1)$ is performed to obtain y(m) $(0 \leqq m \leqq N-1)$. Then, in step S52, autocorrelation of y(m) is calculated to obtain ri $(1 \leqq i \leqq i_{max})$. In step S53, a maximum value rip of ri is detected. The index ip of the detected maximum value rip is an output as the pitch from the microprocessor.

As described above, according to the present invention, a control means which controls the order of an inverse filter in accordance with a mean prediction residual obtained from spectrum data is provided. Thus, a spectrum parameter order used in the inverse filter can be controlled in accordance with the mean prediction residual of the obtained spectrum parameter. As a result, even when a signal having a high prediction gain, such as a sine wave, is input, the fundamental pitch can be stably detected.

What is claimed is:

1. A pitch detecting device comprising:

an inverse filter for receiving a voice signal and subjecting the voice signal to inverse filter processing, thereby obtaining a residual signal of the voice;

correlation calculating means for calculating an autocorrelation function of an output of said inverse filter;

means for detecting a maximum value of the output from said correlation calculating means and outputting an index value corresponding to the maximum value as a pitch of the voice signal; and means for receiving the voice signal, extracting spectrum data of the voice signal, and controlling an order of said inverse filter in accordance with the spectrum data.

2. A device according to claim 1, wherein said means for controlling the order of said inverse filter comprises a circuit for extracting a spectrum of the voice signal, a circuit for calculating the prediction residual of the voice signal in accordance with an output from said spectrum extracting circuit, and an order control circuit for generating a signal to control the order of said inverse filter in accordance with the output from said spectrum extracting circuit and that from said prediction residual calculating circuit.

3. A device according to claim 1, wherein said means for controlling the order of said inverse filter comprises a circuit for extracting a spectrum of the voice signal, a circuit for calculating the prediction residual of the voice signal in accordance with an output from said spectrum extracting circuit, and an order control circuit for generating a signal representing the order of said inverse filter in accordance with the output from said spectrum extracting circuit and that from said prediction residual calculating circuit.

4. A pitch detecting device comprising a microcomputer which receives a voice signal, performs spectrum data extraction by sequential repeated calculation, calculates a prediction residual and updates a count number in every cycle of the sequential repeated calculation, stops the sequential repeated calculation when the prediction residual calculated becomes smaller than a predetermined value, memorizes the count number when the sequential repeated calculation is stopped, then performs an inverse filter calculation with respect to the voice signal by using the memorized count number as a parameter of an order of the inverse filter calculation to obtain a residual signal, calculates an autocorrelation function of the residual signal, and outputs and index value corresponding to a maximum value of the autocorrelation functions as an output.

5. A device according to claim 4, wherein a PARCOR coefficient can be used as the spectrum data.

* * * * *